3,154,549
PROCESS FOR THE PREPARATION OF CARBOXYLIC ACIDS

Leonard H. Beck, Southgate, Mich., assignor to Wyandotte Chemicals Corporation, Wyandotte, Mich., a corporation of Michigan
No Drawing. Filed Oct. 23, 1961, Ser. No. 147,051
13 Claims. (Cl. 260—250)

This invention rates to a process for the preparation of carboxylic acids from heterocyclic nitrogen compounds. More particularly this invention relates to a process for the preparation of pyrazine carboxylic acids and pyridine carboxylic acids.

Pyrazine and pyridine carboxylic acids are well known in the art and are also very useful compounds. For example, pyrazinoic acid is useful as an intermediate in the preparation of pyrazineamide, a known tuberculostat and 3-pyridine-carboxylic acid is a member of the vitamin B complex.

Heretofore pyrazine carboxylic acids have been prepared by oxidizing a methylpyrazine compound with permanganate according to the process described in Stoehr, J. Prakt. Chem. (2) 51, 1895, and pyridine carboxylic acids have been prepared by oxidizing a methylpyridine compound with a large excess of sodium dichromate according to the process described in U.S. 2,415,147. However, both of these processes have certain disadvantages.

Oxidation of methylpyrazine with permanganate results in very low conversion to pyrazinoic acid. Conversions obtained by the use of permanganate are normally in the range of about 10%. The preparation of pyridine carboxylic acids by the oxidation of methylpyridines with a large excess of sodium dichromate requires a step to remove the excess oxidizing agent before the carboxylic acid can be isolated. Barium chloride is added to remove the chromate as barium chromate precipitate. The precipitate is very fine and is difficult and costly to remove by filtration or any other means of separation. Therefore, in view of the foregoing, it is readily apparent that neither of the processes is sufficiently economical to be commercially attractive.

Therefore an object of this invention is to provide a novel process for the preparation of pyrazine and pyridine carboxylic acids.

Another object of this invention is to provide a novel process for the preparation of pyrazine and pyridine carboxylic acids which results in high conversions and is simple and economical.

The above and other objects are accomplished by a process for the preparation of pyrazine and pyridine carboxylic acids which comprises heating a reaction mixture of a heterocyclic nitrogen compound corresponding to the formula:

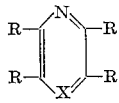

where X is a CH, CR, or N radical and R is a hydrogen or methyl radical but must be a methyl radical in at least one occurrence and an aqueous mixture of an alkali metal dichromate in the proportion of about 1.0 to 1.2 mols of dichromate per methyl radical of the heterocyclic nitrogen compound. The reaction is carried out at about 175 to 325° C. and under a pressure equivalent to the vapor pressure of the reaction mixture at the temperature employed. After the reaction commences phosphoric acid is added to the reaction mixture in an amount sufficient to maintain the pH of the reaction mixture in the range of about 6 to 8 during the reaction.

The novel process of this invention utilizes only the amount of dichromate necessary to oxidize the heterocyclic nitrogen compound to the corresponding carboxylic acid. Therefore, since substantially all of the dichromate is utilized in the reaction, the costly step of removing excess dichromate is completely eliminated. There are other advantages of this process. High conversions are obtained by the use of the process of this invention. For example, 74% conversion to pyrazinoic acid has been obtained. This is considerably greater than the 10% conversions obtained by the permanganate process. High conversions are also obtained when pyridine carboxylic acids are prepared.

In carrying out the process of this invention a pyrazine or a pyridine compound having at least one carbon atom substituted with a methyl radical is utilized as the starting material. Representative of the pyrazine compounds useful in the process are methylpyrazine, 2,3-dimethylpyrazine,
2,5-dimethylpyrazine,
2,6-dimethylpyrazine,
2,3,5-trimethylpyrazine, and
2,3,5,6-tetramethylpyrazine, and representative of the pyridine compounds are 2-methylpyridine,
3-methylpyridine,
4-methylpyridine,
2,3-dimethylpyridine,
2,4-dimethylpyridine,
2,5-dimethylpyridine,
2,6-dmethylpyridine,
3,4-dimethylpyridine,
3,5-dimethylpyridine,
2,3,4-trimethylpyridine,
2,3,5-trimethylpyridine,
2,3,6-trimethylpyridine,
2,4,5-trimethylpyridine,
2,4,6-trimethylpyridine,
3,4,5-trimethylpyridine,
2,3,4,5-tetramethylpyridine,
2,3,4,6-tetramethylpyridine,
2,3,5,6-tetramethylpyridine, and
2,3,4,5,6-pentamethylpyridine.

The heterocyclic nitrogen compound is added to an aqueous mixture containing about 50% water and about 50% of an alkali metal dichromate, for example sodium dichromate, potassium dichromate, lithium dichromate, cesium dichromate and rubidium dichromate. Depending upon the particular dichromate employed the aqueous mixture may be a suspension or a solution at room temperature. Desirably, the dichromate is present in the proportion of about 1 mol per methyl radical of the heterocyclic compound to be oxidized. Hence, 1 mol of the dichromate compound would be employed to oxidize 1 mol of methylpyrazine while 2 mols would be necessary to oxidize 1 mol of 2,3-dimethylpyrazine. To insure complete oxidation up to about a 10% to 20% excess of the dichormate compound may be employed without substantially affecting the product of the reaction. Therefore, about 1.0 to 1.2 mols of dichormate compound should be present per methyl group to be oxidized. However, if greater quantities of dichromate are employed the excess dichromate will have to be removed before isolating the carboxylic acid. Thus the process would then have the disadvantage of the process described in U.S. 2,415,147.

The reaction mixture is heated in a pressure vessel to a temperature of about 175 to 325° C. and preferably 225 to 250° C. and under a pressure equivalent to the vapor pressure of the reaction mixture at the temperature employed. After the reaction starts to proceed phosphoric acid is added to the reaction mixture to control the pH of the mixture in the range of about 6 to 8. The pH range is critical in that at a higher pH the reaction will stop and at a lower pH the carboxylic acid produced will decarboxylate. Thus it should be understood that the phosphoric acid cannot be added before the reaction commences in view of the pH required for the reaction to proceed and must be added during the reaction, since the reaction liberates sodium hydroxide which would stop the reaction. Other acids such as hydrochloric and sulfuric have been found not to be suitable for use in this process.

It is convenient to employ 85% phosphoric acid and inject it into the reaction mixture in two increments when operating within the preferred temperature range. About 80% of the acid is added after about 30 minutes of reaction time and the remaining 20% is added after about 60 minutes of reaction time. However the phosphoric acid may be added in several increments if desired. About 0.08 to 1.0 mol of acid per methyl group to be oxidized is usually sufficient to control the pH within the desired range.

The reaction time will vary depending upon the desired conversion and reaction temperature. A reaction time of from about 1.5 to 5 hours has been found to be convenient when operating within the preferred temperature range. However the percent conversion is directly related to the length of the reaction time.

After the reaction is completed the $Cr_2O_3$ which precipitated during the reaction is removed by filtration, or any other separation method, and the filtrate containing the sodium salt of the carboxylic acid is acidified with a strong mineral acid such as hydrochloric acid, sulfuric acid, phosphoric acid and organic acids which are stronger than the carboxylic acid. The carboxylic acid suspension is then cooled, filtered, washed with water and dried.

The following examples are set forth to illustrate the process of the invention and should not be used to unduly restrict the scope of the invention as it has been described herein. The percent conversion to the carboxylic acid product reported in the examples and previously mentioned was calculated as follows:

$$\text{Percent conversion} = \frac{\text{mols of product obtained}}{\text{mols of heterocyclic nitrogen compound charged}} \times 100$$

Example 1

A one-gallon autoclave equipped with a stirrer, thermometer and reservoir was charged with 3 mols of methylpyrazine, 3.53 mols of sodium dichromate and 1200 ml. of water. The charge was allowed to react at 225° C. under a steam pressure of 350 p.s.i. After 30 minutes of reaction time a phosphoric acid charge which consisted of 400 ml. of a phosphoric acid solution prepared by dissolving 275 grams of 85% phosphoric acid in 500 ml. of water was blown from the reservoir into the autoclave over a 30-minute period. Seventy-five minutes after the first phosphoric acid charge was completed a second charge of the remaining 100 mls. of the phosphoric acid solution was added over a 30-minute period and the reaction continued for a total time of 3 hours.

The pyrazinoic acid was recovered by first filtering the slurry from the autoclave and then acidifying the filtrate with sulfuric acid to a pH of about 1.8 to 2.0 to precipitate pyrazinoic acid. The slurry of pyrazinoic acid was cooled to about 5° C., filtered, washed and dried. The conversion to pyrazinoic acid was calculated to be 74%.

Example 2

Pyrazine-2,5-dicarboxylic acid was prepared by reacting 1.5 mols of 2,5-dimethylpyrazine with 3.53 mols of potassium dichromate according to the procedure described in Example 1. The resulting conversion to pyrazine-2,5-dicarboxylic acid was 67%.

Example 3

Pyrazine-2,6-dicarboxylic acid was prepared by reacting 1.5 mols of 2,6-dimethylpyrazine with 3.53 mols of sodium dichromate according to the procedure described in Example 1. The resulting conversion to pyrazine-2,6-dicarboxylic acid was 59%.

Example 4

Pyridine-2-carboxylic acid is prepared by reacting 3.0 mols of 2-methylpyridine with 3.53 mols of sodium dichromate according to the procedure described in Example 1. The resulting conversion to pyridine-2-carboxylic acid is about 80%.

Example 5

Pyridine-2,5-dicarboxylic acid is prepared by reacting 1.5 mols of 2,5-dimethylpyridine with 3.53 mols of sodium dichromate according to the procedure described in Example 1. The resulting conversion to pyridine-2,5-dicarboxylic acid is about 75%.

Thus it is readily apparent from the foregoing that a novel process has been discovered for the preparation of carboxylic acids of heterocyclic nitrogen compounds which results in high conversions and is both simple and economical to operate. Therefore, it should be obvious to those skilled in the art that the process of this invention is an advancement over the carboxylic acid processes presently employed in the art.

I claim:

1. A process for preparing carboxylic acids which comprises:

(A) heating a reaction mixture of a heterocyclic nitrogen compound corresponding to the formula:

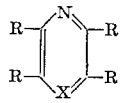

wherein X is a member selected from the group consisting of CH, CR, and N and wherein R is a member selected from the group consisting of hydrogen and methyl radicals and is a methyl radical in at least one occurrence, and an aqueous mixture of an alkali metal dichromate in the proportion of about 1 to 1.2 mols of said dichromate per methyl radical of said heterocyclic nitrogen compound at a temperature of about 175 to 325° C. and under a pressure equivalent to the vapor pressure of the reaction mixture at the temperature employed, and (B) adding phosphoric acid to said reaction mixture after the reaction has commenced in an amount sufficient to maintain the pH of the reaction mixture in the range of about 6 to 8.

2. A process according to claim 1 wherein said heterocyclic nitrogen compound is a pyrazine compound having at least one carbon atom substituted with a methyl radical.

3. A process according to claim 1 wherein said heterocyclic nitrogen compound is 2-methylpyrazine.

4. A process according to claim 1 wherein said heterocyclic nitrogen compound is 2,3-dimethylpyrazine.

5. A process according to claim 1 wherein said heterocyclic nitrogen compound is 2,5-dimethylpyrazine.

6. A process for preparing carboxylic acids which comprises:

(A) heating a reaction mixture of a heterocyclic nitrogen compound corresponding to the formula:

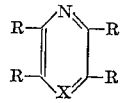

wherein X is a member selected from the group consisting of CH, CR, and N and wherein R is a member selected from the group consisting of hydrogen and methyl radicals and is a methyl radical in at least one occurrence, and an aqueous mixture of an alkali metal dichromate in the proportion of about 1 to 1.2 mols of said dichromate per methyl radical of said heterocyclic nitrogen compound at a temperature of about 225 to 250° C. and under a pressure equivalent to the vapor pressure of the reaction mixture at the temperature employed, (B) adding phosphoric acid to said reaction mixture after the reaction has commenced in an amount sufficient to maintain the pH of the reaction mixture in the range of about 6 to 8, (C) separating and removing the precipitate which forms during the reaction, and (D) adding a mineral acid to the reaction mixture and separating and recovering the resulting precipitated carboxylic acid.

7. A process according to claim 6 wherein said heterocyclic nitrogen compound is 2-methylpyrazine.

8. A process according to claim 6 wherein said heterocyclic nitrogen compound is 2,3-dimethylpyrazine.

9. A process according to claim 6 wherein said heterocyclic nitrogen compound is 2,5-dimethylpyrazine.

10. A process for preparing carboxylic acids which comprises:

(A) heating a reaction mixture of a heterocyclic nitrogen compound corresponding to the formula:

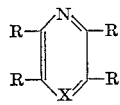

wherein X is a member selected from the group consisting of CH, CR, and N and wherein R is a member selected from the group consisting of hydrogen and methyl radicals and is a methyl radical in at least one occurrence, and an aqueous mixture of an alkali metal dichromate in the proportion of about 1 to 1.2 mols of said dichromate per methyl radical of said heterocyclic nitrogen compound at a temperature of about 225 to 250° C. and under a pressure equivalent to the vapor pressure of the reaction mixture of the temperature employed, (B) adding about 0.8 to 1 mol of phosphoric acid per mol of alkali metal dichromate to said reaction mixture after the reaction has commenced, wherein about 80% of the total phosphoric acid is added after about 30 minutes reaction time and wherein about 20% is added after about 60 minutes reaction time, (C) separating and removing the precipitate which forms during the reaction, and (D) adding a mineral acid to the reaction mixture and separating and recovering the resulting precipitated carboxylic acid.

11. A process according to claim 10 wherein said heterocyclic nitrogen compound is 2-methylpyrazine.

12. A process according to claim 10 wherein said heterocyclic nitrogen compound is 2,3-dimethylpyrazine.

13. A process according to claim 10 wherein said heterocyclic nitrogen compound is 2,5-dimethylpyrazine.

References Cited in the file of this patent
UNITED STATES PATENTS

| | | |
|---|---|---|
| 2,415,147 | Ogilvie et al. | Feb. 4, 1947 |
| 2,794,813 | Farrinacci | June 4, 1957 |

UNITED STATES PATENT OFFICE
CERTIFICATE OF CORRECTION

Patent No. 3,154,549            October 27, 1964

Leonard H. Beck

It is hereby certified that error appears in the above numbered patent requiring correction and that the said Letters Patent should read as corrected below.

Column 3, line 17, for "0.08" read -- 0.8 --.

Signed and sealed this 20th day of April 1965.

(SEAL)
Attest:

ERNEST W. SWIDER            EDWARD J. BRENNER
Attesting Officer            Commissioner of Patents